United States Patent
Shiotsu et al.

(10) Patent No.: US 7,372,406 B2
(45) Date of Patent: May 13, 2008

(54) ANTENNA APPARATUS INCLUDING INVERTED-F ANTENNA HAVING VARIABLE RESONANCE FREQUENCY

(75) Inventors: Shinichi Shiotsu, Kawasaki (JP); Isamu Yamada, Kawasaki (JP); Youichi Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/639,490

(22) Filed: Aug. 13, 2003

(65) Prior Publication Data

US 2004/0041734 A1   Mar. 4, 2004

(30) Foreign Application Priority Data

Aug. 30, 2002 (JP) .............. 2002-253729

(51) Int. Cl.
*H01Q 1/24* (2006.01)
(52) U.S. Cl. ................ 343/700 MS; 343/850
(58) Field of Classification Search ......... 343/700 MS, 343/702, 745, 795, 846, 850, 860
See application file for complete search history.

(56) References Cited

U.S. PATENT DOCUMENTS

| | | | | |
|---|---|---|---|---|
| 3,508,272 A * | 4/1970 | Khan et al. | ............ | 343/745 |
| 5,379,007 A | 1/1995 | Nakahara | ............ | 343/702 |
| 5,734,305 A | 3/1998 | Ervasti | ............ | 343/700 MS |
| 5,969,681 A * | 10/1999 | O'Neill, Jr. | ............ | 343/700 MS |
| 6,034,636 A * | 3/2000 | Saitoh | ............ | 343/700 MS |
| 6,034,640 A * | 3/2000 | Oida et al. | ............ | 343/722 |
| 6,204,819 B1 * | 3/2001 | Hayes et al. | ............ | 343/702 |
| 6,211,830 B1 * | 4/2001 | Monma et al. | ............ | 343/702 |
| 6,255,994 B1 * | 7/2001 | Saito | ............ | 343/700 MS |
| 6,701,167 B2 | 3/2004 | Odachi et al. | ............ | 343/702 |
| 6,734,828 B2 * | 5/2004 | Shor | ............ | 343/795 |
| 6,864,848 B2 * | 3/2005 | Sievenpiper | ............ | 343/767 |
| 7,164,387 B2 * | 1/2007 | Sievenpiper | ............ | 343/702 |

FOREIGN PATENT DOCUMENTS

| | | |
|---|---|---|
| JP | 59-44103 | 3/1984 |
| JP | 4-183102 | 6/1992 |
| JP | 6-97725 | 4/1994 |
| JP | 6-338702 | 12/1994 |
| JP | 7-7321 | 1/1995 |
| JP | 8-186420 | 7/1996 |
| JP | 8-307106 | 11/1996 |
| JP | 10-190344 | 7/1998 |
| JP | 10-284919 | 10/1998 |
| JP | 11-136025 | 5/1999 |
| JP | 11-251825 | 9/1999 |
| JP | 2001-189615 | 7/2001 |
| JP | 2001-223507 | 8/2001 |

OTHER PUBLICATIONS

Japanese Office Action transmitted on Mar. 14, 2006 for corresponding Japanese Application.
Japanese Office Action transmitted on Jun. 6, 2006 for corresponding Japanese Application.

* cited by examiner

*Primary Examiner*—Tan Ho
*Assistant Examiner*—Jimmy T Vu
(74) *Attorney, Agent, or Firm*—Staas & Halsey LLP

(57) ABSTRACT

An inverted-F antenna has at least two antenna conductive elements coupled in series via at least one switch. An antenna apparatus includes control means for controlling the at least one switch.

2 Claims, 8 Drawing Sheets

FIG. 4

| STATE | SW1 | Z (VAR.C11) | SW2 | Z (VAR.C12) | SW3 | Z (VAR.C13) | RESONANCE FREQ. f |
|---|---|---|---|---|---|---|---|
| 1 | a1 | — | a2 | — | a3 | — | f(1) LOW |
| 2 | a1 | — | a2 | — | b3 | Z≅0 (RESONANCE) | f(2) |
| 3 | a1 | — | a2 | — | b3 | Z=2ND MIN (NONRESONANCE) | f(3) |
| ... | ... | ... | ... | ... | ... | ... | ... |
| 4 | a1 | — | a2 | — | b3 | Z=MAX (NONRESONANCE) | f(4) |
| 5 | a1 | — | a2 | — | OFF | — | f(5) |
| 6 | a1 | — | b2 | Z≅0 (RESONANCE) | OFF | — | f(6) |
| 7 | a1 | — | b2 | Z=2ND MIN (NONRESONANCE) | OFF | — | f(7) |
| ... | ... | ... | ... | ... | ... | ... | ... |
| 8 | a1 | — | b2 | Z=MAX (NONRESONANCE) | OFF | — | f(8) |
| 9 | a1 | — | OFF | — | OFF | — | f(9) |
| 10 | b1 | Z≅0 (RESONANCE) | OFF | — | OFF | — | f(10) |
| 11 | b1 | Z=2ND MIN (NONRESONANCE) | OFF | — | OFF | — | f(11) |
| ... | ... | ... | ... | ... | ... | ... | ... |
| 12 | b1 | Z=MAX (NONRESONANCE) | OFF | — | OFF | — | f(12) |
| 13 | OFF | — | OFF | — | OFF | — | f(13) HIGH |

TUNING RANGE BY C13 ← → (states 1–4)
TUNING RANGE BY C12 ← → (states 5–8)
TUNING RANGE BY C11 ← → (states 9–12)

FIG. 7

| STATE | SW1 | Z (VAR.C11) | SW2 | Z (VAR.C12) | SW3 | Z (VAR.C13) | RESONANCE FREQ. f |
|---|---|---|---|---|---|---|---|
| 1 | a1 | — | a2 | — | a3 | — | f(1) LOW |
| 2 | a1 | — | a2 | — | b3 | Z=MIN (NONRESONANCE) | f(2) |
| 3 | a1 | — | a2 | — | b3 | Z=2ND MAX (NONRESONANCE) | f(3) |
| 4 | a1 | — | a2 | — | b3 | Z=MAX (RESONANCE) | f(4) |
| 5 | a1 | — | a2 | — | OFF | — | f(5) |
| 6 | a1 | — | b2 | Z=MIN (NONRESONANCE) | OFF | — | f(6) |
| 7 | a1 | — | b2 | Z=2ND MAX (NONRESONANCE) | OFF | — | f(7) |
| 8 | a1 | — | b2 | Z=MAX (RESONANCE) | OFF | — | f(8) |
| 9 | a1 | — | OFF | — | OFF | — | f(9) |
| 10 | b1 | Z=MIN (NONRESONANCE) | OFF | — | OFF | — | f(10) |
| 11 | b1 | Z=2ND MAX (NONRESONANCE) | OFF | — | OFF | — | f(11) |
| 12 | b1 | Z=MAX (RESONANCE) | OFF | — | OFF | — | f(12) |
| 13 | OFF | — | OFF | — | OFF | — | f(13) HIGH |

TUNING RANGE OF C23 (states 2–4)
TUNING RANGE OF C22 (states 6–8)
TUNING RANGE OF C21 (states 10–12)

| STATE | SW1 | SW2 | SW3 | LENGTH L | RESONANCE FREQ. f [MHz] |
|---|---|---|---|---|---|
| 1 | OFF | OFF | OFF | 6 cm | 1,250 |
| 2 | ON | OFF | OFF | 7 cm | 1,071 |
| 3 | ON | ON | OFF | 8 cm | 938 |
| 4 | ON | ON | ON | 9 cm | 833 |

ANTENNA APPARATUS INCLUDING INVERTED-F ANTENNA HAVING VARIABLE RESONANCE FREQUENCY

FIELD OF THE INVENTION

The present invention relates to an antenna apparatus, and more particularly to an information processing apparatus having an inverted-F antenna.

BACKGROUND OF THE INVENTION

Some current desktop personal computers include respective television tuner cards. Typically, such a tuner card is connected via a coaxial cable to an antenna for receiving terrestrial broadcast signals and an antenna dish for receiving satellite broadcast signals, both of which are mounted on a rooftop.

For these several years, mobile apparatuses, such as notebook personal computers (PCs) and personal digital assistants (PDAs), having the capabilities of performing wireless communications via respective small size antennas coupled to the apparatuses, such as the wireless LAN communications, the Bluetooth standard short distance wireless communications and the mobile telephone communications, have been spreading widely. Such mobile apparatuses, however, cannot receive the current terrestrial analog television signals in good condition with respective small antennas coupled to the apparatuses. Thus most mobile apparatuses do not include television tuner cards. In the future, however, when terrestrial digital television broadcasting becomes available in Japan, such mobile apparatuses will be able to receive, with respective small antennas, relatively high quality RF signals with carriers modulated with digital image signals. Thus it is expected that, in the future, many mobile apparatuses will have a capability of receiving terrestrial digital television broadcast signals.

In general, however, RF signals of a plurality of terrestrial television broadcasts exhibit lower frequencies and a wider frequency range than those of the wireless LAN communications and other short distance wireless communications. Transmission and reception of RF signals of a plurality of terrestrial television broadcasts require a relatively large size antenna, which cannot be accommodated in a mobile apparatus.

Japanese Patent Application Laid-Open Publication (JP-A) No. HEI 11-251825 discloses a small inverted-F antenna which can be accommodated in a small mobile communication apparatus. This inverted-F antenna has an antenna length equal to one quarter of the wavelength $\lambda$ of the transmitted and received RF signal, and is suitable for implementing in a mobile communication apparatus. The inverted-F antenna is associated with a resonant circuit for controlling radiator length in accordance with the frequency and also a resonant circuit for controlling the distance between the feed point and the ground in accordance with the frequency.

Typically, in the inverted-F antenna, a variable capacitance diode is employed for a resonant circuit to control its resonance frequency. However, the typical range of tuning capacitance of such a variable capacitor is relatively small. Widening the range of variable capacitance requires an undesirable relatively high control voltage to be applied to the capacitor.

Japanese Patent Application Laid-Open Publication (JP-A) No. HEI 10-284919 discloses a small antenna apparatus for a mobile communication unit for transmitting and receiving a wide range of RF signals. This antenna apparatus includes the antenna proper and a frequency tuning circuit. The tuning circuit includes an arrangement formed by a diode and a capacitor coupled in parallel. The resonance frequency of the antenna is varied by controlling the on/off operation of the diode.

The inventors have recognized the need for an inverted-F antenna, which has a variable capacitor controllable with a relatively low control voltage, and which has a wider frequency range for receiving RF signals of a plurality of terrestrial broadcasts.

An object of the present invention is to provide an inverted-F antenna that has a wider frequency range.

Another object of the invention is to provide tuning of a resonance frequency of an inverted-F antenna with a wider frequency range.

SUMMARY OF THE INVENTION

In accordance with an aspect of the present invention, an antenna apparatus includes an inverted-F antenna having at least two antenna conductive elements coupled in series via at least one switch, and control means for controlling the at least one switch.

In accordance with another of the invention, an antenna apparatus includes an inverted-F antenna having at least two antenna conductive elements to be coupled in series via at least one resonant circuit.

In accordance with a further aspect of the invention, an information processing apparatus includes a plurality of such antenna apparatuses, and means for selecting one of the plurality of antenna apparatuses.

In accordance with a still further aspect of the invention, an information processing apparatus includes a plurality of such antenna apparatuses. The plurality of antenna apparatuses are oriented in respective different directions.

In accordance with a still further aspect of the invention, an information processing apparatus includes such an antenna apparatus, and channel changing means for controlling said antenna apparatus in accordance with receiving channel information provided by a user.

According to the invention, an inverted-F antenna that has a wider frequency range can be provided.

Throughout the drawings, similar symbols and numerals indicate similar items and functions.

BRIEF DESCRIPTION OF THE DRAWINGS

FIG. 4 shows a table representing the relationship of the resonance frequency of the inverted-F antenna relative to the positions of the switches in the switching and tuning units, and the values of the impedance of the LC resonant circuits containing the variable capacitors;

FIG. 7 shows a table representing the relationship of the resonance frequency of the inverted-F antenna relative to the positions of the switches in the switching and tuning units, and the values of the impedance of the LC resonant circuits containing the variable capacitors;

DESCRIPTION OF THE PREFERRED EMBODIMENTS

Figure 1:
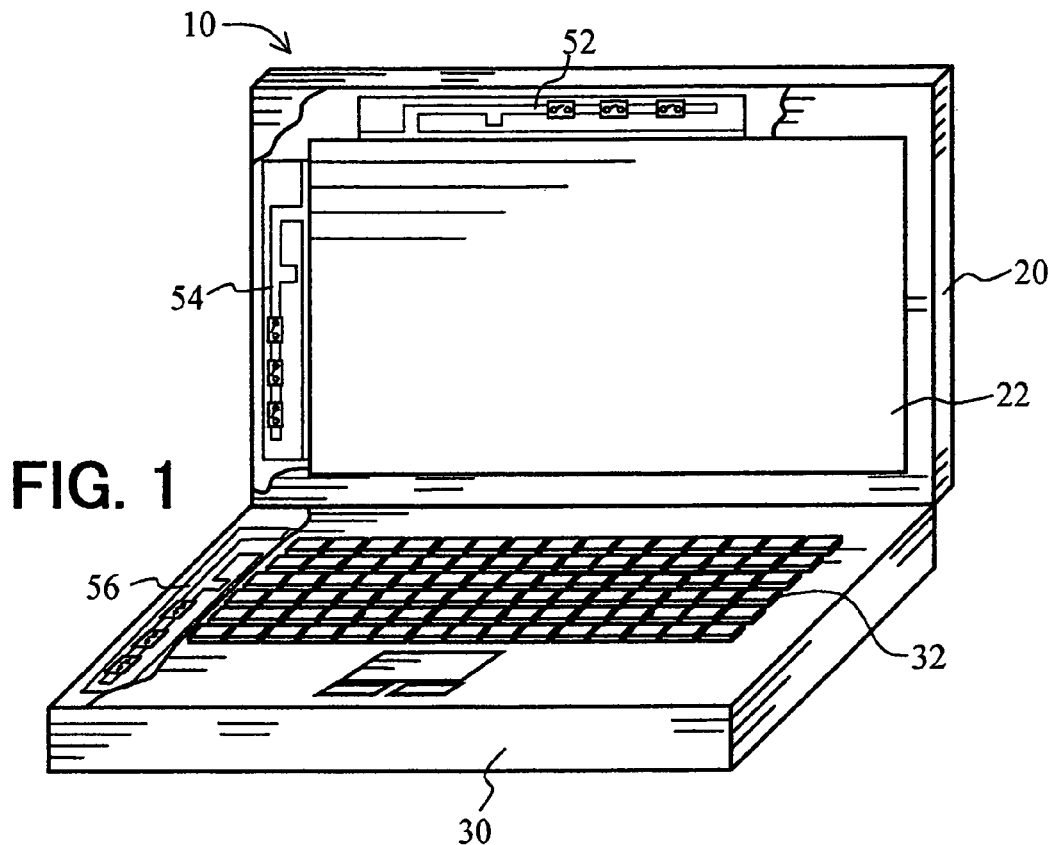
FIG. 1 shows a partially cutaway perspective view illustrating a mobile information processing apparatus, such as a notebook personal computer or a PDA, in accordance with an embodiment of the present invention.

FIG. 1 shows a partially cutaway perspective view illustrating a mobile information processing apparatus or device 10, such as a notebook personal computer (PC) or a PDA, in accordance with an embodiment of the present invention. The information processing apparatus 10 includes an inverted-F antenna 52 disposed within a display housing 20 and in a horizontal direction and substantially along the upper side of a display 22 accommodated within a display housing 20, and another inverted-F antenna 54 disposed within the display housing 20 and in a vertical direction and substantially along the left side of the display 22. The information processing apparatus 10 further includes a further inverted-F antenna 56 disposed within a main unit housing 30 and in a horizontal direction and substantially along the left side of a keyboard 32. The three inverted-F antennas 52, 54 and 56 are arranged so that they are oriented substantially perpendicular to each other when the display housing 20 is opened with its display surface making an angle of 90 degrees with the keyboard surface of the main unit housing 30. The three inverted-F antennas 52, 54 and 56 coupled in parallel to the ground. The three inverted-F antennas 52, 54 and 56 are provided for diversity, such as polarization, frequency, space or angle diversity. The inverted-F antennas 52, 54 and 56 can be used for transmission as well as for reception.

Figure 2:
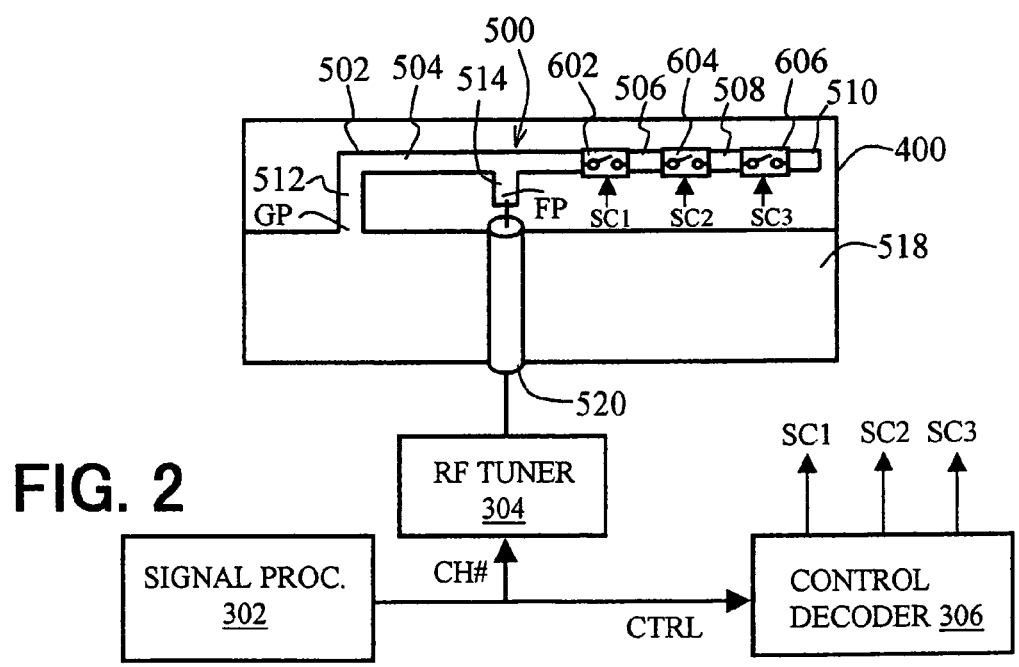
FIG. 2 illustrates the configuration of an inverted-F antenna and its associated components, which can be used for the inverted-F antennas shown in FIG. 1, in accordance with an embodiment of the invention.

FIG. 2 illustrates the configuration of an inverted-F antenna 500 and its associated components, which can be used for the inverted-F antennas 52, 54 and 56 shown in FIG. 1, in accordance with an embodiment of the invention. The inverted-F antenna 500 includes: an inverted F-shaped main conductive element 502 for RF signal radiation and reception; elongated rectangular conductive elements 506 and 508 located at intermediate positions of the antenna 500 and an elongated rectangular conductive element 510 located at a distal end of the antenna 500; and a grounding metal conductor 518. The conductive elements 506-510 are coupled in series to the element 502 and used for radiation and reception of RF electromagnetic waves. The elements 502, 506, 508 and 510 are mounted as a formed plate on a printed circuit board 400 or formed as strip lines on it. The inverted-F antenna further includes switching units 602, 604 and 606 which are mounted on the printed circuit board 400 and used for tuning or adjusting the effective length L or the resonance frequency f of the antenna 500.

The inverted F-shaped main element 502 is made up of a long narrow segment 504, a short base segment 512 branching out downward and substantially vertically from one end of the segment 504 and connected at a ground point GP to the grounding conductor 518, and a short feeder segment 514 branching out downward and substantially vertically from the segment 504 at an intermediate point between the two ends thereof, and separated or spaced from the grounding conductor 518. The segment 504 and the elements 506, 508 and 510 are arranged in a substantially straight line, extending substantially parallel to the upper edge of the grounding conductor 518 that is closer to element 502. The feeder element 514 is coupled at its end or feed point FP to a feeder line or RF signal line 520, such as a coaxial cable.

The switching unit 602 is coupled between the other end of the segment 504 and one end of the element 506. The switching unit 604 is coupled between the other end of the element 506 and one end of the element 508. The switching unit 606 is coupled between the other end of the element 508 and one end of the element 510.

The effective length L of the inverted-F antenna 500 is represented by the sum of the combined lengths of the segments 512 and 504 of the element 502 and the combined lengths of the elements 506 to 510 electrically coupled to the element 502. The length of each of the elements 504 to 514 is typically in the order of about 1 cm to about 10 cm. The switching units 602, 604 and 606 are shown exaggerated in size for illustrative purposes, but actually they are much smaller in dimensions or in size than the elements 502 and 506 to 510, and each of dimensions of the switching units is about one to a few milli-meters for example.

The shapes of the elements 502, 506, 508 and 510 of the antenna 500 and possibly their associated inductance and capacitance are adjusted so that the voltage standing wave ratio (VSWR) ($=(1+|r|)/(1-|r|)$, where r represents the complex voltage reflection coefficient) of the RF signal on the feeder element 514 becomes equal to an appropriate value, for example, two (2). When the antenna 500 is completely matched to the feeder line 520 in terms of impedance, the value of VSWR is one (1). When the value of VSWR is made somewhat larger than one, the quality of the RF signal is degraded somewhat, but the range of resonance frequencies of the antenna 500 becomes wider.

The information processing apparatus 10 further includes a signal processor 302, an RF tuner 304 and a control decoder 306. The signal processor 302 may be a processor generally used in personal computers and the like, which includes a CPU, a ROM, a RAM and the like. The signal processor 302 is coupled to the RF tuner 304 and the control decoder 306. The RF tuner 304 is coupled to the feeder line 520. The control decoder 306 is coupled to the switching units 602 to 606 of the antenna 500.

The signal processor 302 provides data representative of a channel identification or a channel number to the RF tuner 304, and also provides, to the control decoder 306, a control signal for tuning the resonance frequency f of the antenna 500 that corresponds to the channel identification. The control decoder 306 decodes the control signal to generate further control signals suitable for controlling the switching units 602 to 606, and provide the thus generated ON/OFF control signals SC1, SC2 and SC3 to the respective switching units 602 to 606. The control signal provided to the control decoder 306 may contain ON/OFF control instructions for the respective switching units 602 to 606. Alternatively, the control decoder 306 may receive the channel identification as the control signal, and decode the channel identification to generate the further control signals suitable for controlling the switching units 602 to 606.

In response to the control signal SC1, the switching unit 602 couples or decouples the element 502 to or from the element 506 to thereby determine the effective length L or the resonance frequency f of the antenna 500. In response to the control signal SC2, the switching unit 604 further couples or decouples the element 506 to or from the element 508 to thereby determine the effective length L or the resonance frequency f of the antenna 500. In response to the control signal SC3, the switching unit 606 further couples or decouples the element 508 to or from the element 510 to thereby determine the effective length L or the resonance frequency f of the antenna 500. The units 602 to 606 are single-pole single-throw switches.

When the switching unit 602 is in an OFF state, the effective length L of the antenna 500 is the sum of the length L1 of the segment 512 and the length L2 of the segment 504, i.e., the antenna length L1+L2 of the main conductive element 502. When the switching unit 602 is in an ON state and the switching unit 604 is in an OFF state, the effective length L of the antenna 500 is the sum of the length L1+L2 of the element 502 and the length L3 of the element 506. When the switching units 602 and 604 are in ON states and the switching unit 606 is in an OFF state, the effective length L of the antenna 500 is the sum of the length L1+L2 of the element 502, the length L3 of the element 506 and the length L4 of the element 508. When the switching units 602 to 606 are in ON states, the effective length L of the antenna 500 is the sum of the length L1+L2 of the element 502, the length L3 of the element 506, the length L4 of the element 508 and the length L5 of the element 510. The transmission/reception frequency band of the antenna 500 can be varied in this manner. The effective length L of the antenna 500 is approximately equal to one quarter of the wavelength $\lambda$ of the transmitted or received RF signal.

In accordance with the embodiment of FIG. 2, a small inverted-F antenna having a wider frequency range can be provided using simple digital circuitry for turning the switches on and off.

Figure 3:
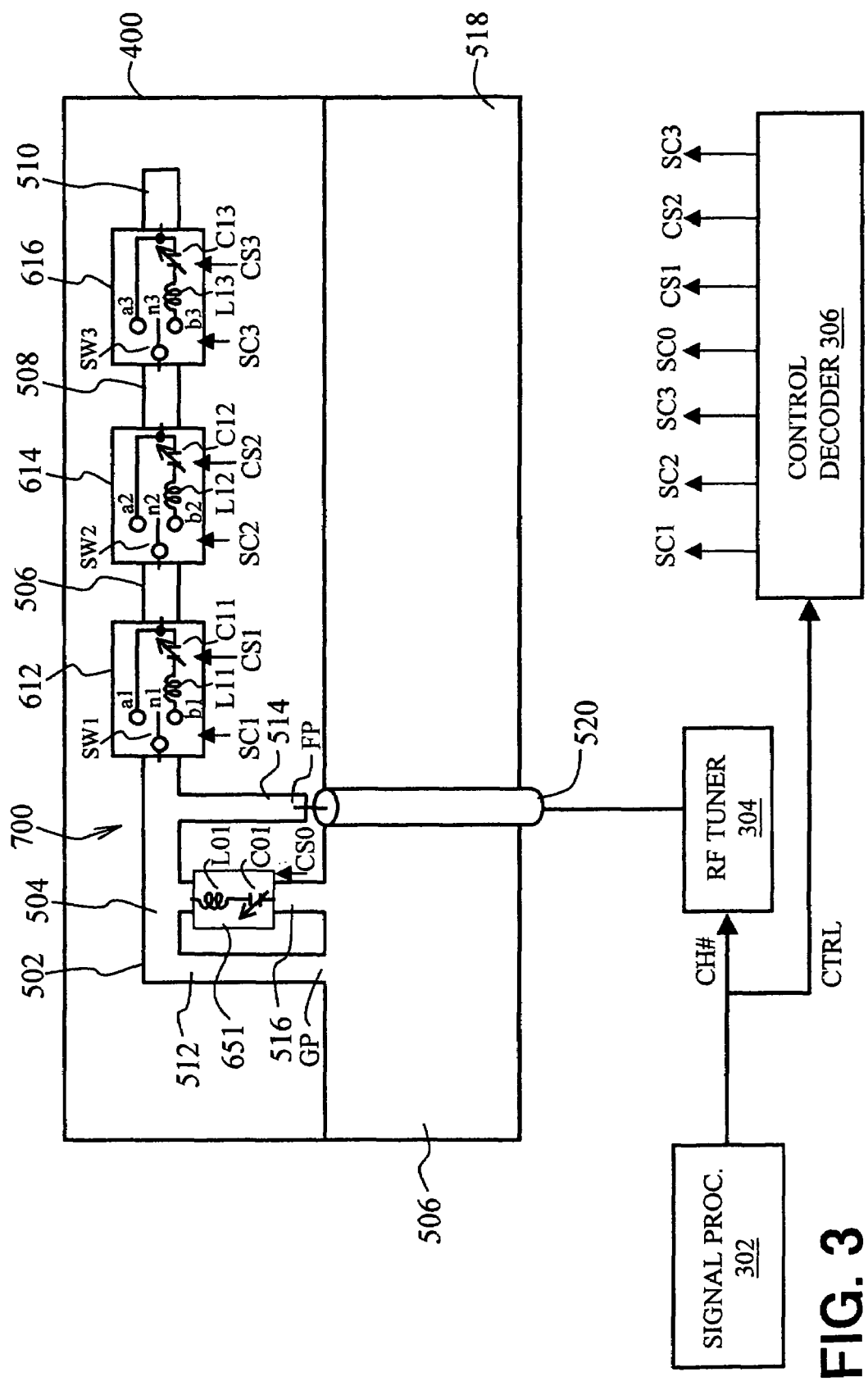
FIG. 3 illustrates the configuration of an inverted-F antenna and its associated components which can be used for the inverted-F antennas shown in FIG. 1, in accordance with another embodiment of the invention.

FIG. 3 illustrates the configuration of an inverted-F antenna 700 and its associated components which can be used for the inverted-F antennas 52, 54 and 56 shown in FIG. 1, in accordance with another embodiment of the invention. The inverted-F antenna 700, similarly to the one shown in FIG. 2, includes the inverted F-shaped main conductive element 502, the elongated rectangular conductive elements 506, 508 and 510, and the grounding metal conductor 518. The inverted-F antenna 700 further includes switching and tuning units 612, 614 and 616 for tuning the effective length L or the resonance frequency f of the antenna 700, and a further conductive segment 516 containing an impedance or resonance frequency tuning unit 651 for matching the impedance of the antenna 700 to that of the feeder line 520, for example 50Ω.

The switch SW1 in the unit 612 takes one of three positions, i.e., the position of a bypass or short-circuiting terminal a1 coupled to the element 506, the position of a terminal b1 coupled to an LC resonant circuit which in turn is coupled to the element 506, and the position of a neutral state n1 which is the OFF state in which a pole of the switch SW1 is coupled to neither of the terminals a1 and b1. That is, the switch SW1 is a single-pole double-throw switch having the neutral position. The terminal a1 is provided for coarse tuning of the effective length L or the resonance frequency f of the antenna 700. The LC resonant circuit is formed by an inductor L11 and a variable capacitor C11 coupled in series, and is provided for fine tuning of the effective length L or the resonance frequency f. Generally, the impedance of an inductor and a variable capacitor coupled in series takes a minimum value at the resonance frequency.

Similarly, the switch SW2 in the unit 614 takes one of three positions, i.e., the position of a terminal a2 coupled to the element 508, the position of a terminal b2 coupled to an LC resonant circuit which in turn is coupled to the element 508, and the position of a neutral state n2 which is the OFF state in which a pole of the switch SW2 is coupled to neither of the terminals a2 and b2. The terminal a2 is provided for coarse tuning of the effective length L or the resonance frequency f of the antenna 700. The LC resonant circuit is formed by an inductor L12 and a variable capacitor C12 coupled in series, and is provided for fine tuning of the effective length L or the resonance frequency f.

Similarly, the switch SW3 in the unit 616 takes one of three positions, i.e., the position of a terminal a3 coupled to the element 510, the position of a terminal b3 coupled to an LC resonant circuit which in turn is coupled to the element 510, or the position of a neutral state n3 which is the OFF state in which a pole of the switch SW3 is coupled to neither of the terminals a3 and b3. The terminal a3 is provided for coarse tuning of the effective length L or the resonance frequency f of the antenna 700. The LC resonant circuit is formed by an inductor L13 and a variable capacitor C13 coupled in series, and is provided for fine tuning of the effective length L or the resonance frequency f.

The conductive segment 516 of the inverted F-shaped main element 502 branches out substantially vertically from the segment 504 at a position intermediate between the segments 512 and 514, and is connected to the grounding conductor 518. The tuning unit 651 is disposed halfway in the conductive segment 516 between its two separated portions, i.e., one separated segment portion connected to the segment 504 and the other separated segment portion connected to the grounding conductor 518. Thus the tuning unit 651 is coupled in series to the segment 516. The tuning unit 651 includes an LC resonant circuit which is formed by an inductor L01 and a variable capacitor C01 coupled in series. The tuning unit 651 is provided so as to match the impedance of the antenna 700 to that of the feeder line 520 when the resonance frequency is tuned by the units 612 to 616, and thus to prevent impedance mismatch from occurring and from causing VSWR to vary when the resonance frequency is tuned by the units 612 to 616.

The switches SW1 to SW3, inductors L11 to L13, and variable capacitors C11 to C13 in the respective units 612, 614 and 616, as well as the inductor L01 and variable capacitor C01 in the unit 651, are shown exaggerated in size for illustrative purposes, but actually they are much smaller in dimensions or size than the elements 502 and 506 to 510, and each of dimensions of the inductors and capacitors is about one to a few millimeters for example.

The signal processor 302, similarly to the one shown in FIG. 2, provides data representative of a channel identification to the RF tuner 304, and also provides, to the control decoder 306, a control signal for tuning the resonance frequency f of the antenna 700 that corresponds to the channel identification. The control decoder 306 decodes the control signal to generate further control signals suitable for controlling the units 612 to 651, and provide the thus generated digital ON/OFF control signals SC1, SC2 and SC3 and also analog variable capacitor control voltage signals CS1 to CS3 and CS0 to the respective units 612 to 651. The control decoder 306 includes a digital-analog converter for generating the control signals CS1 to CS3 and CS0. The control signal provided to the control decoder 306 may include ON/OFF control instructions for the respective switching units 612 to 616. Alternatively, the control decoder 306 may receive the channel identification as the control signal, and decode the channel identification to generate the further control signals suitable for controlling the units 612 to 651.

In response to the control signal SC1, the unit 612 coarsely tunes the effective length L or the resonance frequency f of the antenna 700, by coupling the switch SW1 to the position of the terminal a1 or b1 or the position of the OFF state n1 to thereby couple the element 502 to the element 506 or to the LC resonant circuit formed by the devices L11 and C11 coupled to the element 506 or decouple the element 502 from them. When the switch SW1 is placed on the terminal b1, the unit 612 finely tunes the effective length L or the resonance frequency f of the antenna 700 in response to the analog control signal CS1, by controlling the variable capacitance of the variable capacitor C11 to thereby finely tune the resonance frequency of the LC resonant circuit.

Similarly, the unit 614 coarsely tunes the effective length L or the resonance frequency f of the antenna 700 in response to the control signal SC2, by coupling the switch SW2 to the position of the terminal a2 or b2 or the position of the OFF state n2 to thereby couple the element 506 to the element 508 or to the LC resonant circuit formed by the elements L12 and C12 coupled to the element 508, or decouple the switch SW2 from them. When the switch SW2 is placed on the terminal b2, the unit 614 finely tunes the effective length L or the resonance frequency f of the antenna 700 in response to the analog control signal CS2, by controlling the variable capacitance of the variable capacitor C12 to thereby finely tune the resonance frequency of the LC resonant circuit.

Similarly, the unit 616 coarsely tunes the effective length L or the resonance frequency f of the antenna 700 in response to the control signal SC3, by coupling the switch SW3 to the position of the terminal a3 or b3 or the position of the OFF state n3 to thereby couple the element 508 to the element 510 or to the LC resonant circuit formed by the elements L13 and C13 coupled to the element 510, or decouple the element 508 from them. When the switch SW3 is placed on the terminal b3, the unit 616 finely tunes the effective length L or the resonance frequency f of the antenna 700 in response to the analog control signal CS3, by controlling the variable capacitance of the variable capacitor C13 to thereby finely tune the resonance frequency of the LC resonant circuit.

In response to the analog control signal CS0, the unit 651 controls the variable capacitance of the variable capacitor C01 to tune the resonance frequency of the LC resonant circuit and thereby effectively or virtually vary the distance between the feed point FP and the ground point GP, to thereby match the impedance of the antenna 700 to that of the feeder line 520. The control signal CS0 is predetermined in accordance with the values of the control signals CS1 to CS3.

FIG. 4 shows a table representing the relationship of the resonance frequency f of the inverted-F antenna 700 relative to the positions of the switches SW1 to SW3 in the switching and tuning units 612 to 616, and the values Z's of the impedance of the LC resonant circuits containing the variable capacitors C11 to C13, respectively. In the table, the resonance frequency f increases substantially monotonically from $f(1)$ to $f(13)$.

Referring to FIG. 4, in State 1, the switches SW1, SW2 and SW3 select the positions of the terminals a1, a2 and a3, respectively, i.e., the short-circuiting positions. Accordingly, all of the elements 506 to 510 are coupled to the element 502 of the antenna 700, so that the length L of the antenna 700 becomes the longest (L1+L2+L3+L4+L5). Thus the resonance frequency f becomes the lowest, i.e., $f(1)$.

In States 2 to 4, the switches SW1 and SW2 select the positions of the terminals a1 and a2, respectively, while the switch SW3 selects the position of the terminal b3. Accordingly, the elements 506 and 508 are coupled to the element 502 of the antenna 700, and the LC resonant circuit formed by the inductor L13 and capacitor C13 in the unit 616 is coupled between the elements 508 and 510.

In State 2, by tuning the capacitance of the capacitor C13 so as to cause the LC resonant circuit to become in the resonant state, the impedance Z of the LC resonant circuit is reduced to almost zero, substantially the same state as State 1. Thus the resonance frequency f becomes $f(2) \cong f(1)$.

In States 3 and 4, by tuning the capacitance of the capacitor C13 so as to cause the LC resonant circuit to become in a non-resonant state, the impedance Z of the LC resonant circuit is increased and the element 510 is decoupled from the element 508. Thus the effective length L of the antenna 700 is reduced. In this way, the resonance frequency f of the antenna 700 can be increased to $f(3)$ and then to $f(4)$. The resonance frequency $f(4)$ when the impedance Z is the largest is approximately equal to the resonance frequency $f(5)$ when the switch SW3 is in the OFF state (State 5).

In State 5, the switches SW1 and SW2 select the positions of the terminals a1 and a2, respectively, while the switch SW3 selects the OFF position. Accordingly, the elements 506 and 508 are coupled to the element 502 of the antenna 700, so that the length L of the antenna 700 is L1+L2+L3+L4. Thus the resonance frequency f becomes $f(5)$.

In States 6 to 8, the switch SW1 selects the position of the terminal a1, the switch SW2 selects the position of the terminal b2, and the switch SW3 selects the OFF position. Accordingly, the element 506 is coupled to the element 502 of the antenna 700, and the LC resonant circuit formed by the inductor L12 and capacitor C12 in the unit 614 is coupled between the elements 506 and 508.

In State 6, by tuning the capacitance of the capacitor C12 so as to cause the LC resonant circuit to become in the resonant state, the impedance Z of the LC resonant circuit is reduced to almost zero, substantially the same state as State 5. Thus the resonance frequency f becomes $f(6) \cong f(5)$.

In States 7 and 8, by tuning the capacitance of the capacitor C12 so as to cause the LC resonant circuit to become in a non-resonant state, the impedance Z of the LC resonant circuit is increased, to thereby decouple the element 508 from the element 506 and reduce the effective length L of the antenna 700. In this way, the resonance frequency f of the antenna 700 can be increased to $f(7)$ and then to $f(8)$. The resonance frequency $f(8)$ when the impedance Z is the largest is approximately equal to the resonance frequency $f(9)$ when the switch SW2 is in the OFF state (State 9).

In State 9, the switch SW1 selects the position of the terminal a1, while each of the switches SW2 and SW3 selects the OFF position. Accordingly, the element 506 is coupled to the element 502 of the antenna 700, so that the length L of the antenna 700 is L1+L2 +L3. Thus the resonance frequency f becomes $f(9)$.

In States 10 to 12, the switch SW1 selects the position of the terminal b1, while each of the switches SW2 and SW3 selects the OFF position. Accordingly, the LC resonant circuit formed by the inductor L11 and capacitor C11 in the unit 602 is coupled between the elements 502 and 506.

In State 10, by tuning the capacitance of the capacitor C11 so as to cause the LC resonant circuit to become in the resonant state, the impedance Z of the LC resonant circuit is reduced to almost zero, substantially the same state as State 9. Thus the resonance frequency f becomes f(10).

In States 11 and 12, by tuning the capacitance of the capacitor C11 so as to cause the LC resonant circuit to become in a non-resonant state, the impedance Z of the LC resonant circuit is increased, to thereby decouple the element 506 from the element 502 and reduce the effective length L of the antenna 700. In this way, the resonance frequency f of the antenna 700 can be increased to f(11) and then f(12). The resonance frequency f(12) when the impedance Z is the largest is equal to the resonance frequency f(13) when the switch SW1 is in the OFF state (State 13).

In State 13, each of the switches SW1, SW2 and SW3 selects the OFF position. Accordingly, the antenna 700 includes only the element 502, so that the length L of the antenna 700 is L1+L2. Thus the resonance frequency f becomes a maximum value, i.e., f(13).

The resonance frequency f(2) is approximately equal to f(1), and the resonance frequency f(4) is approximately equal to f(5). Thus, in the unit 612, the terminal a1 may be eliminated so that the switch SW1 takes either the position of the terminal b1 or the position of the OFF state n1, the position of the OFF state n1 may be eliminated so that the switch SW1 takes either one of the positions of the terminals a1 and b1, or the switch SW1 and the terminal a1 may be eliminated and the other end of the segment 504 may be coupled permanently or fixedly to the terminal b1.

Similarly, the resonance frequency f(6) is approximately equal to f(5), and the resonance frequency f(8) is approximately equal to f(9). Thus, in the unit 614, the terminal a2 may be eliminated so that the switch SW2 takes either the position of the terminal b2 or the position of the OFF state n2, the position of the OFF state n2 may be eliminated so that the switch SW2 takes either one of the positions of the terminals a2 and b2, or the switch SW2 and the terminal a2 may be eliminated and the other end of the element 506 may be coupled permanently to the terminal b2.

Similarly, the resonance frequency f(10) is approximately equal to f(9), and the resonance frequency f(12) is approximately equal to f(13). Thus, in the unit 616, the terminal a3 may be eliminated so that the switch SW3 takes either the position of the terminal b3 or the position of the OFF state n3, the position of the OFF state n3 may be eliminated so that the switch SW3 takes either one of the positions of the terminals a3 and b3, or the switch SW3 and the terminal a3 may be eliminated and the other end of the element 508 may be coupled permanently to the terminal b3.

In this way, the switches SW1, SW2 and SW3 and the variable capacitors C11 to C13 in the respective LC resonant circuits are controlled, and thereby the resonance frequency f of the antenna 700 can be varied over the range of f(1) to f(13). Thus a wide frequency tuning range can thus be obtained.

The values of the inductors L11 to L13 and the capacitors C11 to C13 are determined so that the relation among variable resonance frequencies $f_{11} > f_{12} > f_{13}$ is established, where $f_{11}$ represents the variable resonance frequency of the LC resonant circuit formed by the inductor L11 and capacitor C11, $f_{12}$ represents the variable resonance frequency of the LC resonant circuit formed by the inductor L12 and capacitor C12, and $f_{13}$ represents the variable resonance frequency of the LC resonant circuit formed by the inductor L13 and capacitor C13.

When proper impedance matching of the antenna 700 cannot be achieved by controlling the switches SW1, SW2 and SW3 and the variable capacitors C11 to C13 in the respective LC resonant circuits, and consequently the VSWR increases undesirably, the unit 651 optimizes the impedance matching of the antenna 700 by controlling the variable capacitance of the variable capacitor C01 in response to the control signal CS0 to thereby effectively or virtually vary the distance from the feed point FP to the ground point GP. Alternatively, in place of the unit 651, a plurality of LC resonant circuits containing switches and coupled in series, which are similar to those of the units 612 to 616, may be coupled in series with the segment 516, and the tuning range for impedance matching may be expanded by controlling them in the same manner as the units 612 to 616.

Figure 5:
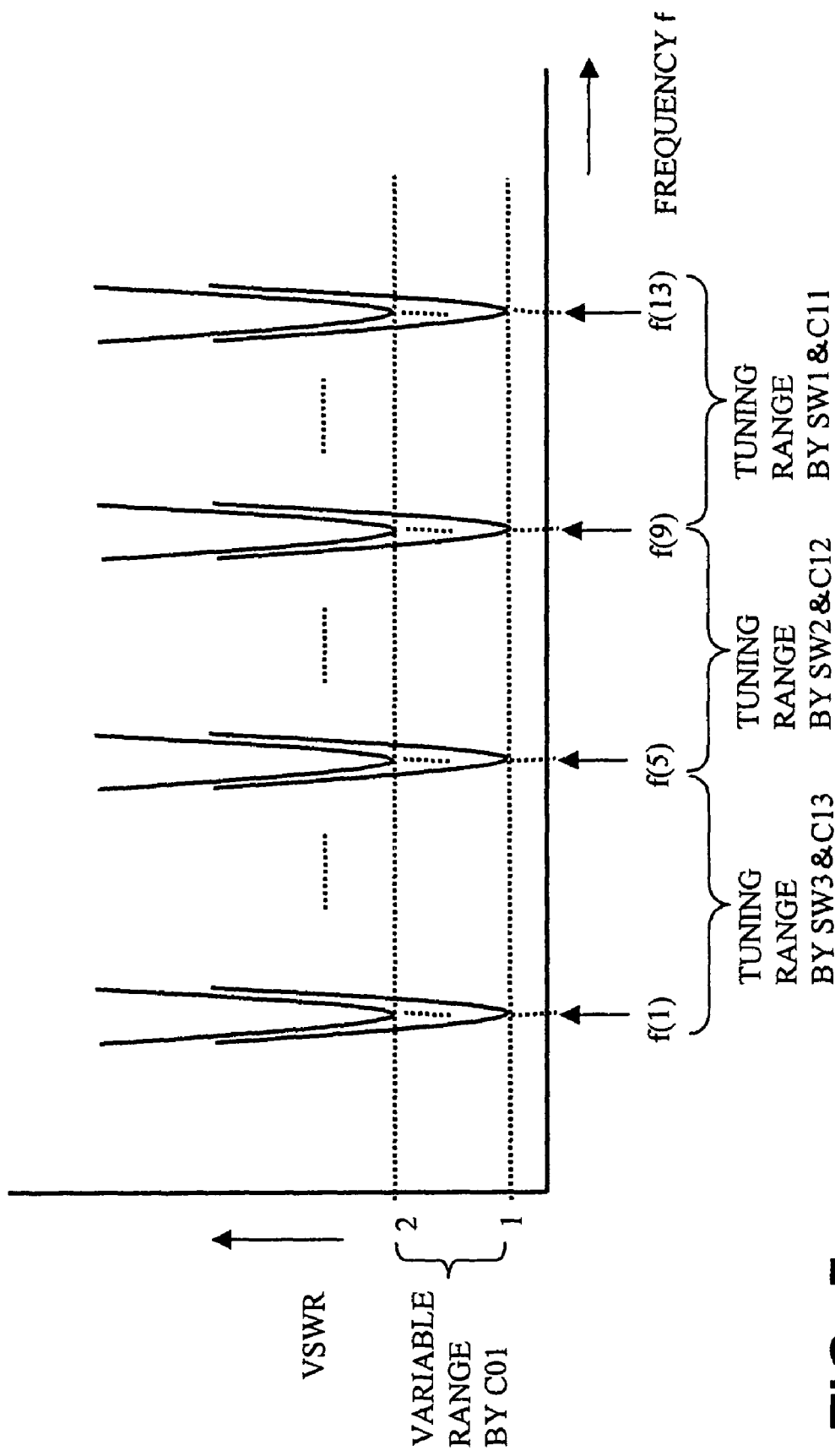
FIG. 5 shows the tuning ranges of the resonance frequency and the VSWR in accordance with the embodiment of FIG. 3.

FIG. 5 shows the tuning ranges of the resonance frequency f and the VSWR in accordance with the embodiment of FIG. 3.

Figure 6:
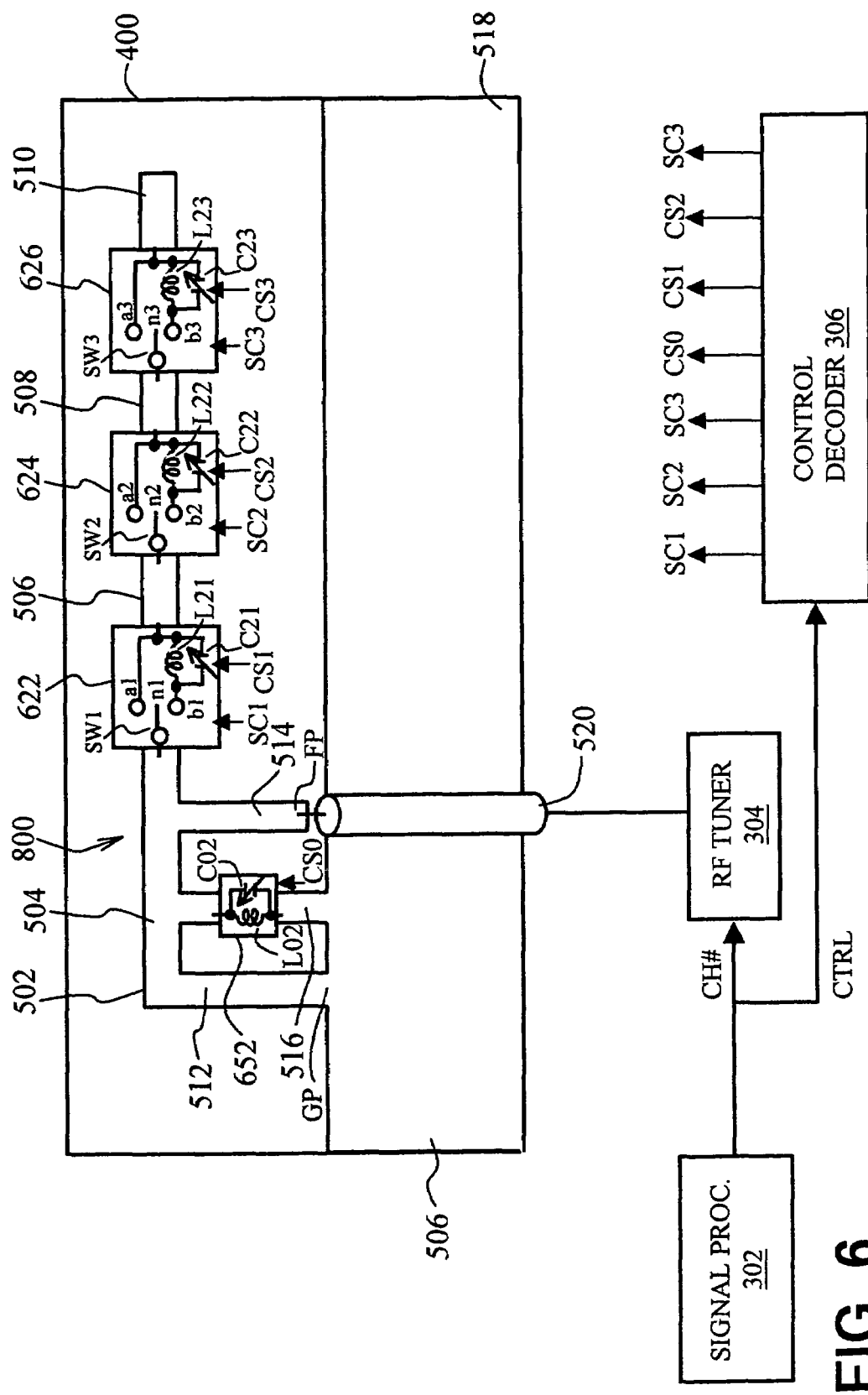
FIG. 6 illustrates the configuration of an inverted-F antenna and its associated components which can be used for the inverted-F antennas shown in FIG. 1, in accordance with a further embodiment of the invention.

FIG. 6 illustrates the configuration of an inverted-F antenna 800 and its associated components which can be used for the inverted-F antennas 52, 54, and 56 shown in FIG. 1, in accordance with a further embodiment of the invention. The inverted-F antenna 800, similarly to the one shown in FIGS. 2 and 3, includes the inverted F-shaped main conductive element 502, the elongated rectangular conductive elements 506, 508 and 510, and the grounding metal conductor 518. The inverted-F antenna 800 further includes switching and tuning units 622, 624 and 626 for tuning the effective length L or the resonance frequency f of the antenna 800, and a further conductive segment 516 containing an impedance or resonance frequency tuning unit 652 for matching the impedance of the antenna 800 to that of the feeder line 520.

The units 622, 624, 626 and 652 have configurations similar to those of the corresponding units 612, 614, 616 and 651 shown in FIG. 6, except that each LC resonant circuit is formed by an inductor and a capacitor coupled in parallel. Generally, the impedance of an inductor and a variable capacitor coupled in parallel takes a maximum value at the resonance frequency.

In the unit 622, an LC circuit for fine tuning, which is formed by an inductor L21 and a variable capacitor C21 coupled in parallel, is coupled between the terminal b1 and the element 506. In the unit 624, an LC circuit for fine tuning, which is formed by an inductor L22 and a variable capacitor C22 coupled in parallel, is coupled between the terminal b2 and the element 508. In the unit 626, an LC circuit for fine tuning, which is formed by an inductor L23 and a variable capacitor C23 coupled in parallel, is coupled between the terminal b3 and the element 510. The tuning unit 652 includes an LC resonant circuit formed by an inductor L02 and a variable capacitor C02 coupled in parallel. Similarly to the unit 651 in FIG. 3, the tuning unit 652 is provided for matching the impedance of the antenna 800 to that of the feeder line 520 when the resonance frequency is tuned by the units 622 to 626.

FIG. 7 shows a table representing the relationship of the resonance frequency f of the inverted-F antenna 800 relative to the positions of the switches SW1 to SW3 in the switching and tuning units 622 to 626, and the values Z's of the impedance of the LC resonant circuits containing the variable capacitors C21 to C23, respectively. In the table, the resonance frequency f increases substantially monotonically from f(1) to f(13).

Referring to FIG. 7, similarly to the table shown in FIG. 4, in State 1, the switches SW1, SW2 and SW3 select the positions of the terminals a1, a2 and a3, respectively. In this state, the length L of the antenna 800 becomes the longest (L1+L2+L3+L4 +L5). Thus the resonance frequency f becomes the lowest, i.e., f(1).

In States 2 to 4, the switches SW1 and SW2 select the positions of the terminals a1 and a2, respectively, while the switch SW3 selects the position of the terminal b3. Accordingly, the elements 506 and 508 are coupled to the element 502 of the antenna 800, and the LC resonant circuit formed by the inductor L23 and capacitor C23 in the unit 626 is coupled between the elements 508 and 510.

In States 2 and 3, by tuning the capacitance of the capacitor C23 so as to cause the LC resonant circuit to become in a non-resonant state, the impedance Z of the LC resonant circuit is increased, to thereby decouple the element 510 from the element 508 and reduce the effective length L of the antenna 800. Thus the resonance frequency f of the antenna 800 can be increased to f(2) and then to f(3).

In State 2, by tuning the capacitance of the capacitor C23 so as to cause the LC resonant circuit to become in a non-resonant state, the impedance Z of the LC resonant circuit is set to a minimum value, substantially the same state as State 1. Thus the resonance frequency f becomes f(2)≅f(1).

In State 4, by tuning the capacitance of the capacitor C23 so as to cause the LC resonant circuit to become in the resonant state, the impedance Z of the LC resonant circuit is set to a maximum value, to thereby decouple the element 510 from the element 508. The resonance frequency f(4) then is approximately equal to the resonance frequency f(5) when the switch SW3 is in the OFF state (State 5).

In State 5, the switches SW1 and SW2 select the positions of the terminals a1 and a2, respectively, while the switch SW3 selects the OFF position. Accordingly, the elements 506 and 508 are coupled to the element 502 of the antenna 800, so that the length L of the antenna 800 becomes L1+L2+L3+L3. Thus the resonance frequency f becomes f(5).

In States 6 to 8, the switch SW1 selects the position of the terminal a1, the switch SW2 selects the position of the terminal b2, and the switch SW3 selects the OFF position. Accordingly, the element 506 is coupled to the element 502 of the antenna 800, and the LC resonant circuit formed by the inductor L22 and capacitor C22 in the unit 624 is coupled between the elements 506 and 508.

In States 6 and 7, by tuning the capacitance of the capacitor C22 so as to cause the LC resonant circuit to become in a non-resonant state, the impedance Z of the LC resonant circuit is increased, to thereby decouple the element 508 from the element 506 and reduce the effective length L of the antenna 800. Thus the resonance frequency f of the antenna 800 can be increased to f(6) and then to f(7).

In State 6, by tuning the capacitance of the capacitor C22 so as to cause the LC resonant circuit to become in a non-resonant state, the impedance Z of the LC resonant circuit is set to a minimum, substantially the same state as State 5. Thus the resonance frequency f becomes f(6)≅f(5).

In State 8, by tuning the capacitance of the capacitor C22 so as to cause the LC resonant circuit to become in the resonant state, the impedance Z of the LC resonant circuit is set to a maximum, to thereby decouple the element 508 from the element 506. The resonance frequency f(8) then is approximately equal to the resonance frequency f(9) when the switch SW2 is in the OFF state (State 9).

In State 9, the switch SW1 selects the position of the terminal a1, while each of the switches SW2 and SW3 selects the OFF position. Accordingly, the element 506 is coupled to the element 502 of the antenna 800. Thus the resonance frequency f becomes f(9).

In States 10 to 12, the switch SW1 selects the position of the terminal b1, while each of the switches SW2 and SW3 selects the OFF position. Accordingly, the LC resonant circuit formed by the inductor L21 and capacitor C21 is coupled between the elements 502 and 506.

In States 10 and 11, by tuning the capacitance of the capacitor C21 so as to cause the LC resonant circuit to become in a non-resonant state, the impedance Z of the LC resonant circuit is increased, to thereby decouple the element 506 from the element 502 and reduce the effective length L of the antenna 800. Thus the resonance frequency f of the antenna 800 can be increased to f(10) and then to f(11).

In State 10, by tuning the capacitance of the capacitor C21 so as to cause the LC resonant circuit to become in a non-resonant state, the impedance Z of the LC resonant circuit is set to a minimum value, substantially the same state as State 1. Thus the resonance frequency f becomes f(10)≅f(9).

In State 12, by tuning the capacitance of the capacitor C21 so as to cause the LC resonant circuit to become in the resonant state, the impedance Z of the LC resonant circuit is set to a maximum value, to thereby decouple the element 506 from the element 502. The resonance frequency f(12) then is approximately equal to the resonance frequency f(13) when the switch SW1 is in the OFF state (State 13).

In State 13, each of the switches SW1, SW2 and SW3 selects the OFF position. Accordingly, the resonance frequency f of the antenna 800 becomes a maximum value, i.e., f(13).

The values of the inductors L21 to L23 and the capacitors C21 to C23 are determined so that the relationship among the resonance frequencies $f_{21}>f_{22}>f_{23}$ is established, where $f_{21}$ represents the variable resonance frequency of the LC resonant circuit formed by the inductor L21 and capacitor C21, $f_{22}$ represents the variable resonance frequency of the LC resonant circuit formed by the inductor L22 and capacitor C22, and $f_{23}$ represents the variable resonance frequency of the LC resonant circuit formed by the inductor L23 and capacitor C23.

Similarly to the unit in FIG. 3, in the unit 622, the terminal a1 may be eliminated so that the switch SW1 takes either the position of the terminal b1 or the position of the OFF state n1, the position of the OFF state n1 may be eliminated so that the switch SW1 takes either one of the positions of the terminals a1 and b1, or the switch SW1 and the terminal a1 may be eliminated and the other end of the segment 504 may be coupled permanently to the terminal b1.

Similarly, in the unit 624, the terminal a2 may be eliminated so that the switch SW2 takes either the position of the terminal b2 or the position of the OFF state n2, the position of the OFF state n2 may be eliminated so that the switch SW2 takes either one of the positions of the terminals a2 and b2, or the switch SW2 and the terminal a2 may be eliminated and the other end of the element 506 may be coupled permanently to the terminal b2.

Similarly, in the unit 626, the terminal a3 may be eliminated so that the switch SW3 takes either the position of the terminal b3 or the position of the OFF state n3, the position of the OFF state n3 may be eliminated so that the switch SW3 takes either one of the positions of the terminals a3 and b3, or the switch SW3 and the terminal a3 may be eliminated and the other end of the element 508 may be coupled permanently to the terminal b3.

Similarly to the unit in FIG. 3, the unit 652 optimizes the impedance matching of the antenna 800 by controlling the variable capacitance of the variable capacitor C02 in response to the control signal CS0 and to thereby effectively or virtually vary the distance from the feed point FP to the ground point GP. Alternatively, in place of the unit 652, a plurality of LC resonant circuits containing switches and coupled in series, which are similar to those of the units 622 to 626, may be coupled in series with the segment 516, and the tuning range for impedance matching may be expanded by controlling them in the same manner as the units 622 to 626.

FIG. 5 also shows the tuning ranges of the resonance frequency f and the VSWR in accordance with the embodiment of FIG. 6.

In this way, according to the embodiments of FIGS. 3 and 6, since the LC resonant circuits in the units 612 to 616 and 651 and the units 622 to 626 and 652 are only responsible for fining tuning of the resonance frequency f of the antenna 700 or 800, the capacitance tuning range of the variable capacitor in each LC resonant circuit is small. Thus it requires just a relatively simple analog voltage source for a variable capacitance diode.

Figure 8:
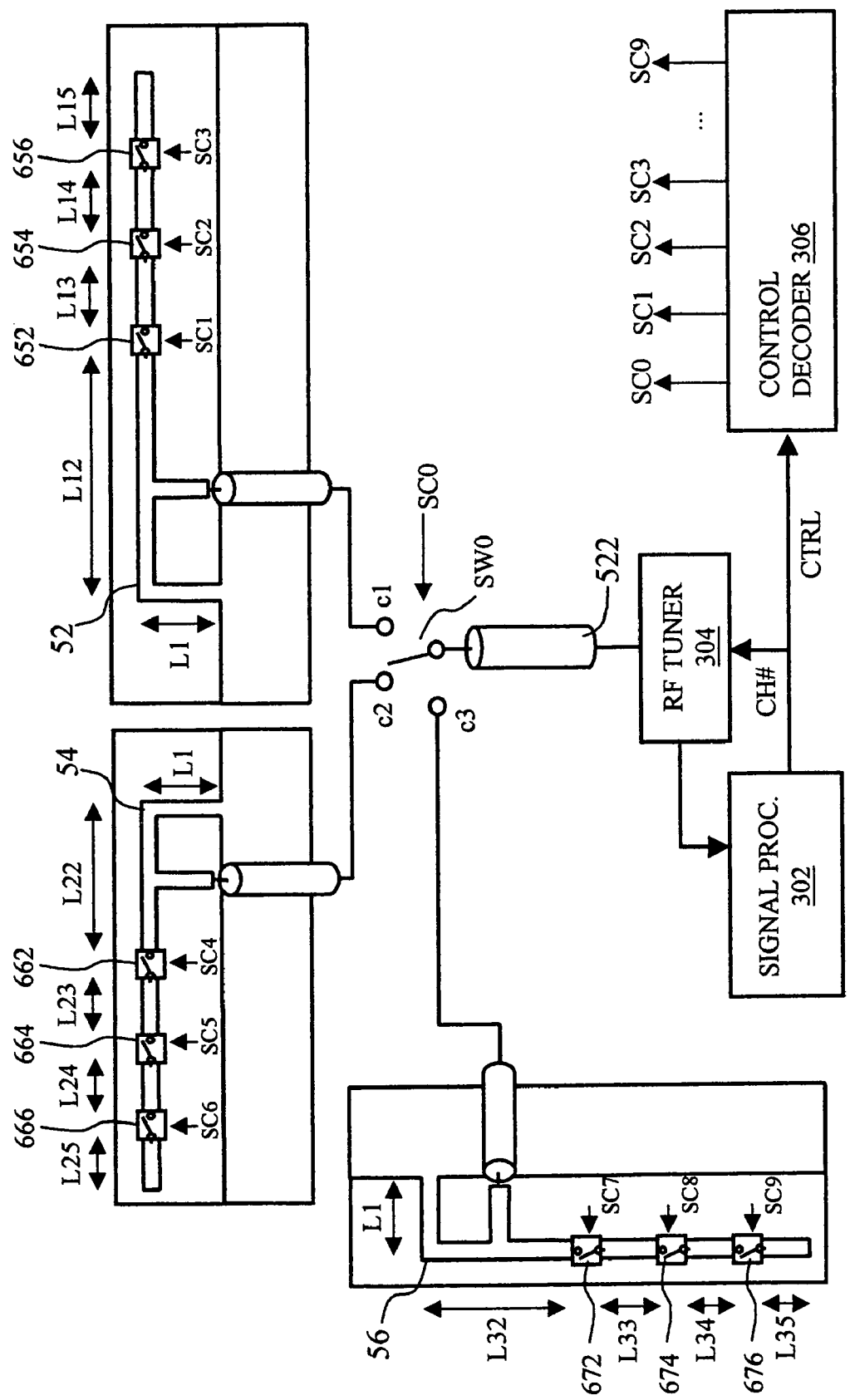
FIG. 8 illustrates the configuration of the inverted-F antennas shown in FIG. 1 and their associated components, in accordance with a still further embodiment of the invention.

FIG. 8 illustrates the configuration of the inverted-F antennas 52, 54 and 56 shown in FIG. 1 and their associated components, in accordance with a still further embodiment of the invention. Each of the antennas 52, 54 and 56 has the same configuration as that of the inverted-F antenna 500, 700 or 800 shown in FIG. 2, 3 or 6. The antennas 52, 54 and 56 are coupled in parallel to the ground point, and are coupled to the RF tuner 304 via their respective feeder lines, via a switch SW0, and via a feeder line 522 such as a coaxial cable.

In response to a digital switch control signal SC0, the switch SW0 selectively couples one of the inverted-F antennas 52, 54 and 56 to the feeder line 522. The signal processor 302 may monitor the transmitting or receiving condition of the RF signal and select one of the inverted-F antennas that exhibits the best transmitting or receiving condition.

The control decoder 306 provides the switch control signals SC0 to SW0, and also provides the control signals SC1, SC2, . . . and SC9 and the like to the respective resonance frequency tuning switching units 652 to 676.

In response to the control signals SC1 to SC3 and the like, the antenna 52 is tuned to provide an effective length within the range from the shortest length (L1+L12) to the longest length (L1+L12+L13 +L14+L15). In response to the control signals SC4 to SC6 and the like, the antenna 54 is tuned to provide an effective length within the range from the shortest length (L1+L22) to the longest length (L1+L22+L23 +L24+ L25). In response to the control signals SC7 to SC9 and the like, the antenna 56 is tuned to provide an effective length within the range from the shortest length (L1+L32) to the longest length (L1+L32+L33 +L34+L35).

Figures 9, 10:
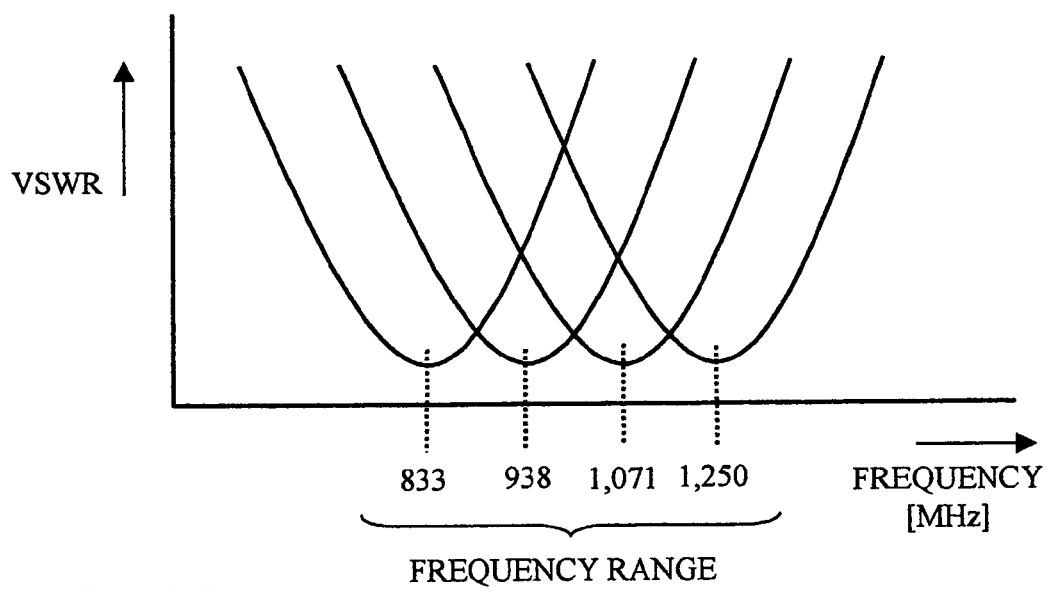
FIG. 9 shows the relationship between the variable effective length and the resonance frequency for the inverted-F antennas shown in FIG. 8.
FIG. 10 shows the relationship between the VSWR and the resonant frequencies shown in FIG. 9.

FIG. 9 shows the relationship between the variable effective length L and the resonance frequency f for the inverted-F antennas 52, 54 and 56 shown in FIG. 8. For example, when the antenna length L is 6 cm, the resonance frequency is 1,250 MHz; when the antenna length L is 7 cm, the resonance frequency is 1,071 MHz; when the antenna length L is 8 cm, the resonance frequency is 938 MHz; and when the antenna length L is 9 cm, the resonance frequency is 833 MHz.

FIG. 10 shows the relationship between the VSWR and the resonant frequencies shown in FIG. 9.

The units 602 to 606 in FIG. 2, the units 612 to 616 and 651 in FIG. 3, and the units 622 to 626 and 652 in FIG. 6 may be combined properly among them. For example, the unit 604 in FIG. 2 may be replaced by the unit 614 in FIG. 3 or the unit 624 in FIG. 6. Further, the unit 616 in FIG. 3, for example, may be replaced by the unit 606 in FIG. 2 or the unit 626 in FIG. 6. The unit 651 in FIG. 2, for example, may be replaced by the unit 652 in FIG. 3.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An antenna apparatus comprising:
an inverted-F antenna having at least two antenna conductive elements coupled in series via at least one switch, and having at least one switch or variable resonant circuit between one of said at least two antenna conductive elements and the ground for matching the impedance of said inverted-F antenna to the impedance of a feeder line coupled to said inverted-F antenna,
wherein a switch between two adjacent antenna conductive elements of said at least two antenna conductive elements is placed on one of the following three positions:
a first position for coupling a terminal of one of said two adjacent antenna conductive elements directly to a terminal of the other adjacent antenna conductive element,
a second position for coupling the terminal of said one adjacent antenna conductive element via said variable LC resonant circuit to the terminal of said other adjacent antenna conductive element, and
a third position for separating the terminal of said one adjacent antenna conductive element from the terminal of said other adjacent antenna conductive element; and
a controller controlling said at least one switch.

2. An information processing apparatus comprising:
an antenna apparatus comprising an inverted-F antenna having at least two antenna conductive elements coupled in series via at least one switch, and having at least one switch or variable resonant circuit between one of said at least two antenna conductive elements and ground for matching an impedance of said inverted-F antenna to an impedance of a feeder line coupled to said inverted-F antenna,
wherein a switch between two adjacent antenna conductive elements of said at least two antenna conductive elements is placed on one of the following three positions:
a first position for coupling a terminal of one of said two adjacent antenna conductive elements directly to a terminal of the other adjacent antenna conductive element,
a second position for coupling the terminal of said one adjacent antenna conductive element via said variable LO resonant circuit to the terminal of said other adjacent antenna conductive element, and
a third position for separating the terminal of said one adjacent antenna conductive element from the terminal of said other adjacent antenna conductive element, and comprising a controller for controlling said at least one switch; and
a channel changing unit for controlling said antenna apparatus in accordance with receiving channel information provided by a user.

* * * * *

UNITED STATES PATENT AND TRADEMARK OFFICE
CERTIFICATE OF CORRECTION

| | |
|---|---|
| PATENT NO. | : 7,372,406 B2 |
| APPLICATION NO. | : 10/639490 |
| DATED | : May 13, 2008 |
| INVENTOR(S) | : Shinichi Shiotsu et al. |

Page 1 of 1

It is certified that error appears in the above-identified patent and that said Letters Patent is hereby corrected as shown below:

Column 14, Line 56, change "LO" to --LC--.

Signed and Sealed this

Seventh Day of October, 2008

JON W. DUDAS
*Director of the United States Patent and Trademark Office*